United States Patent [19]

Yu

[11] Patent Number: 5,495,390
[45] Date of Patent: Feb. 27, 1996

[54] COMPUTER HOUSING WITH A DETACHABLE CAP COVERING AN OPERATION SPEED DISPLAY MOUNTED IN A RECESS WITH A THROUGH HOLE

[76] Inventor: Chi T. Yu, 9F-1, No. 1, Lane 115, Sec.3, Ming Chuan E. Rd., Taipei, Taiwan

[21] Appl. No.: 275,397

[22] Filed: Jul. 15, 1994

[51] Int. Cl.⁶ .............................. G06F 1/16; H05K 7/02; H05K 7/10
[52] U.S. Cl. .............................. 361/683; 361/685; 40/663
[58] Field of Search .............................. 40/448, 663, 668; 368/296; 364/708.1; 312/223.2; 359/83; 348/787, 790, 794, 832, 834–836, 841, 844; 235/1 D; 361/679, 685, 681–683, 724

[56] References Cited

U.S. PATENT DOCUMENTS 3,887,791 6/1975 Kitchens .............................. 235/1 D
4,422,728 12/1983 Andreaggi .............................. 359/83
4,514,920 5/1985 Shafir et al. .............................. 40/448
5,450,221 9/1995 Owen et al. .............................. 359/83

*Primary Examiner*—Michael W. Phillips
*Attorney, Agent, or Firm*—Browdy and Neimark

[57] ABSTRACT

A computer housing including a holder frame for mounting diskdrives when the housing is disposed in the vertical position, a locating frame for holding down diskdrives when the housing is disposed in the horizontal position, a detachable display cap detachably covered on a display mounting recess on the front panel to protect the display, which shows the operation speed of the computer, a hole through the recess for pushing out the cap with a tool, and two sliding side panels detachably fastened at two opposite sides through hooked joints.

4 Claims, 7 Drawing Sheets

5,495,390

COMPUTER HOUSING WITH A DETACHABLE CAP COVERING AN OPERATION SPEED DISPLAY MOUNTED IN A RECESS WITH A THROUGH HOLE

BACKGROUND OF THE INVENTION

The present invention relates to a computer housing, and relates more particularly to such a computer housing which permits the computer to be installed horizontally or vertically and, which permits the computer operation speed display to be conveniently adjusted.

Various computers are known and intensively used for different purposes. Recently, a computer is generally equipped with a display for showing the operation speed. If the display is to be adjusted, the housing of the computer must be opened and then the display must be dismantled. If the internal space of the computer is fully occupied by diskdrives, interface cards, etc., it will be very difficult to dismantle the display for an adjustment. Further, because the housing for a horizontal computer does not fit for a vertical computer, different computer housings must be used for making horizontal and vertical computers. Conventional computer housings still have a common drawback. Because the side panels of regular computer housings are commonly fixed in place by screws, it mounting as well as dismounting procedures of the side panels are complicated.

SUMMARY OF THE INVENTION

The present invention has been accomplished to provide a computer housing which eliminates the aforesaid drawbacks. It is therefore an object of the present invention to provide a computer housing which is suitable for making a horizontal computer as well as a vertical computer. It is another object of the present invention to provide a computer housing which permits the computer operation speed display to be conveniently adjusted. It is still another object of the present invention to provide a computer housing which allows the side panels to be installed or dismantled conveniently without the use of any tools or fastening elements.

According to one aspect of the present invention, the computer housing comprises display mounting recess on the front panel, a rack disposed inside the display mounting recess to hold a circuit board and a display for showing the operation speed of the computer, a cap fastened to the display mounting recess through hooked joints and having a window, through which the display is seen from the outside, a through hole through the display mounting recess for inserting a tool from the inside of the computer to push the cap away from the display mounting recess during a repair work. According to another aspect of the present invention, the computer housing further comprises a holder frame and a loop-like locating frame for holding diskdrives in the diskdrive slot on the front panel so that the computer can be disposed in the horizontal position or the vertical position as desired. According to still another aspect of the present invention, the computer housing further comprises two opposite side panels each having a plurality of L-shaped retaining rods angled in the same direction and engaged into respective retaining holes on two opposite side frames of the computer housing and a pull strip for moving the respective side panel backwards away from each side frame.

DETAILED DESCRIPTION OF THE PREFERRED EMBODIMENT

Figure 1:
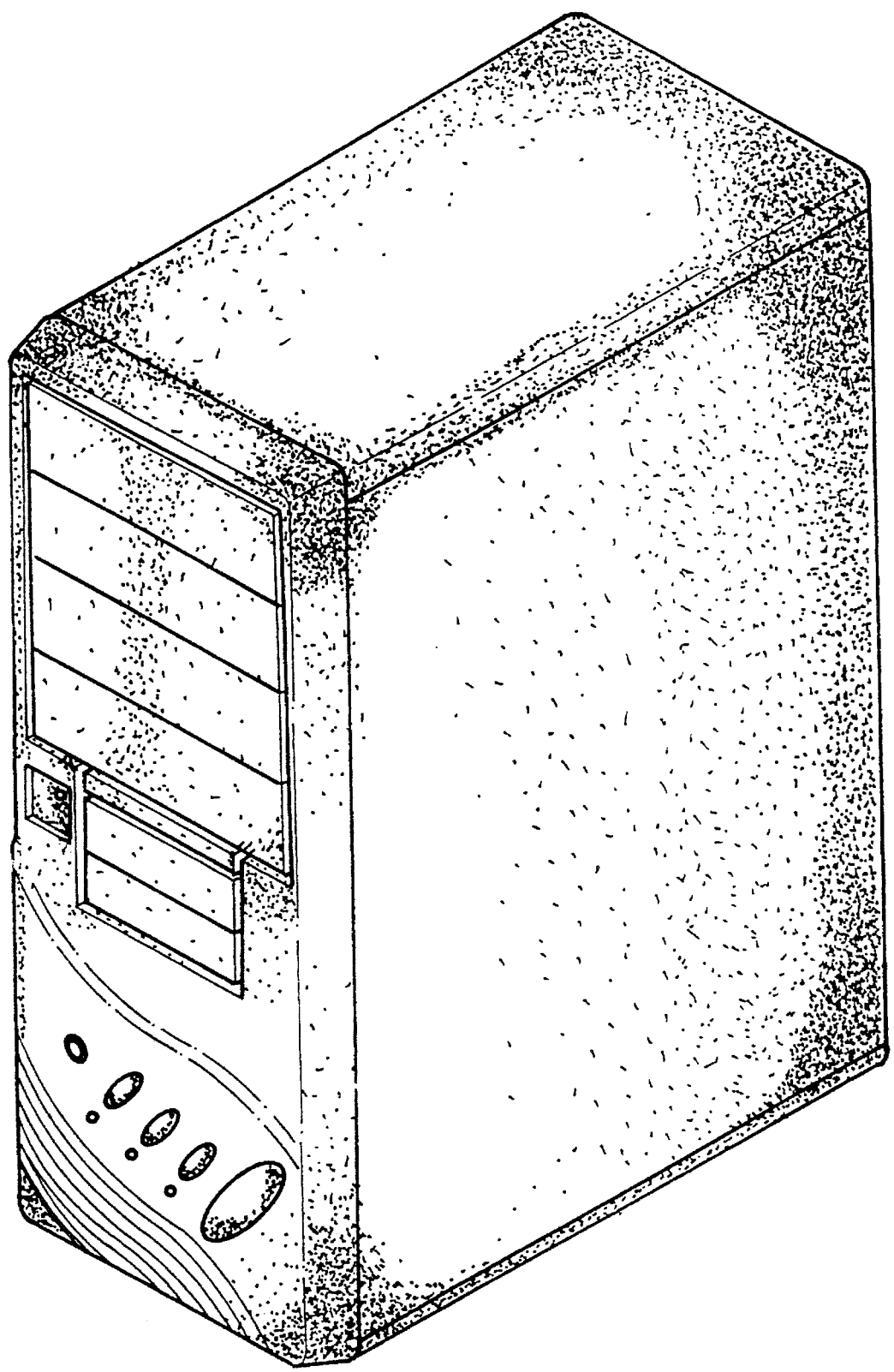
FIG. 1 is an elevational view of a computer housing according to the present invention.
Figure 2:
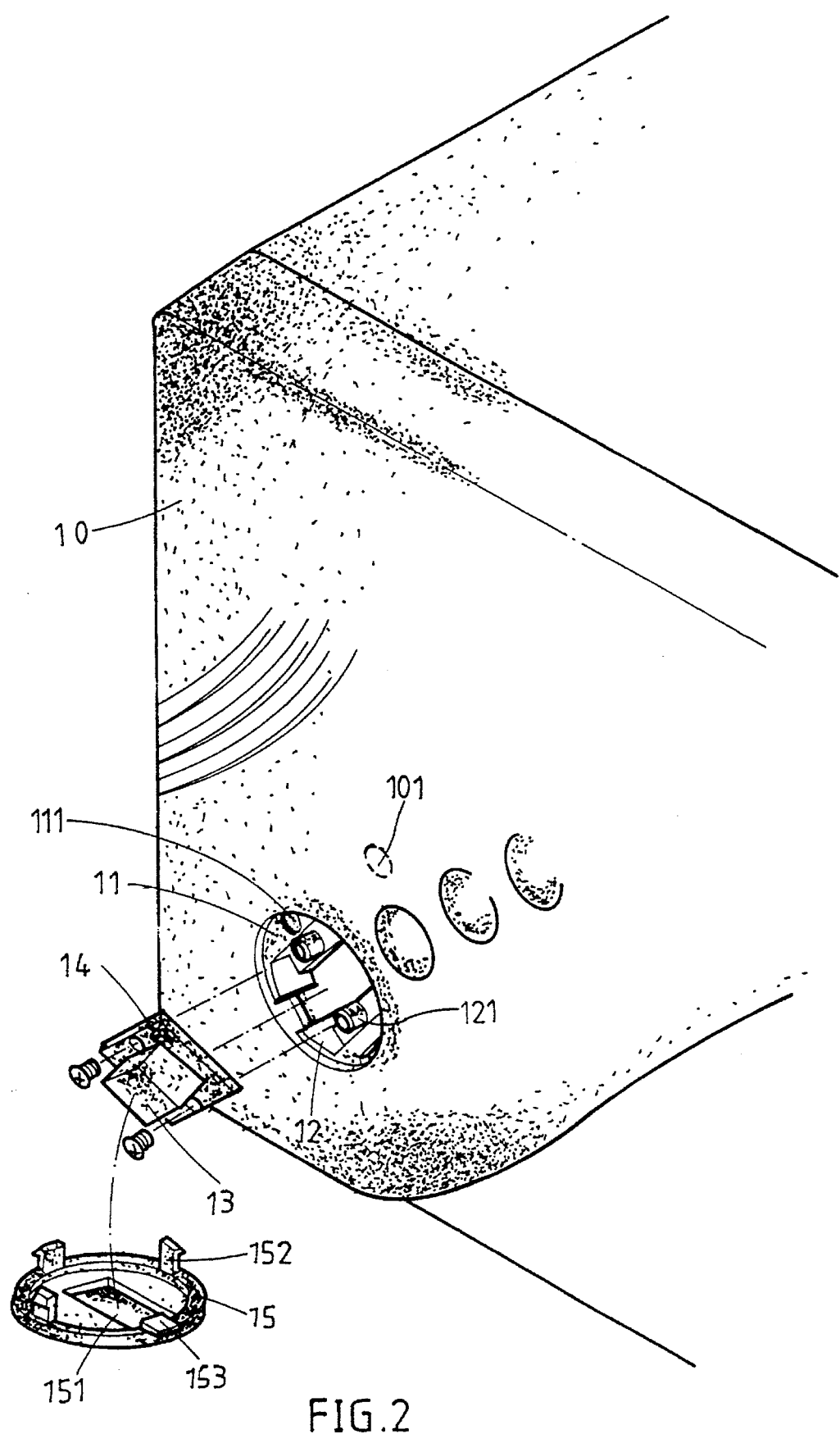
FIG. 2 is an exploded view of the cap, the display, and the circuit board for the computer housing shown in FIG. 1.
Figure 3:
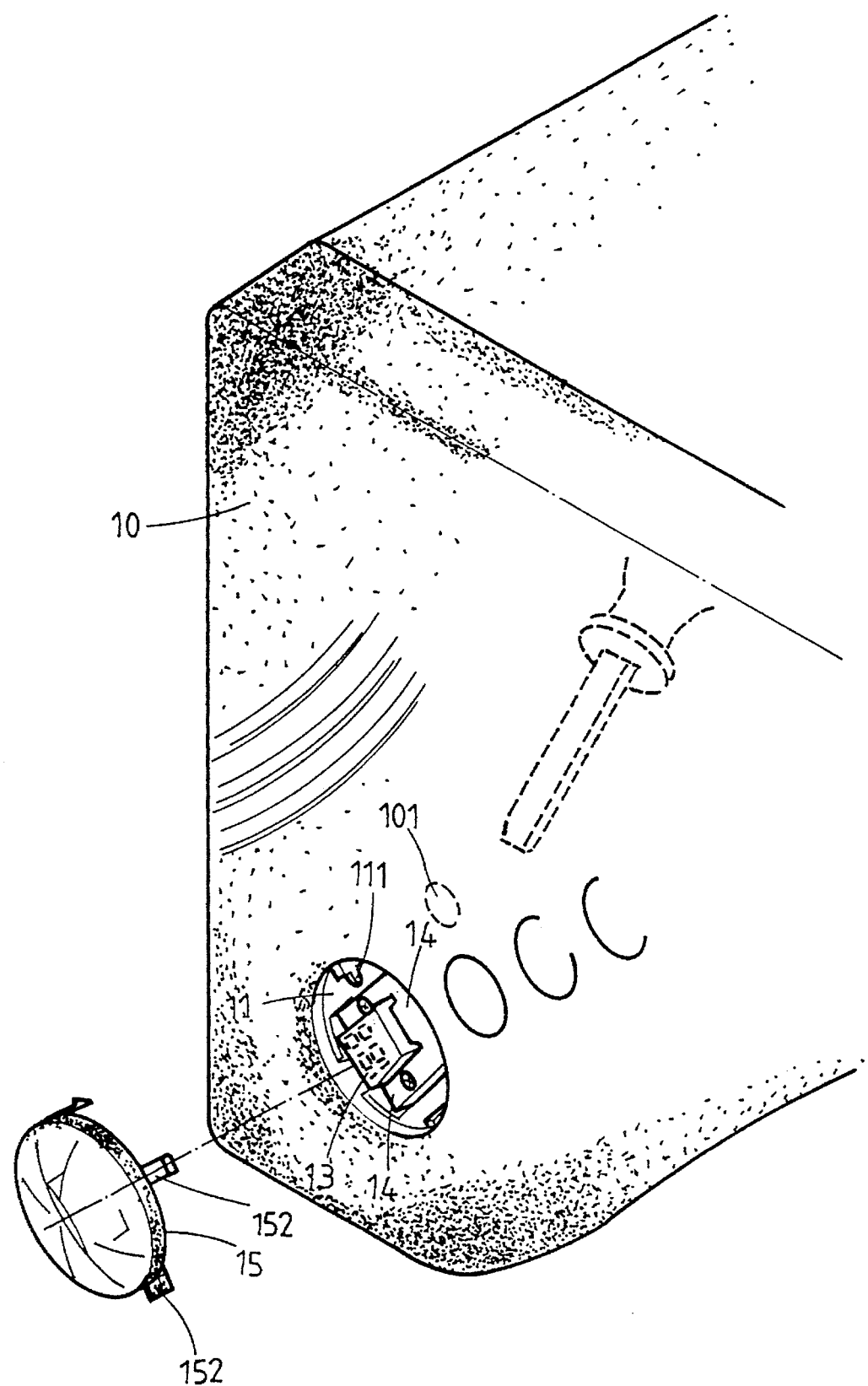
FIG. 3 is similar to FIG. 2 but showing the display and the circuit board installed.

Referring to FIGS. 2 and 3, the front panel 10 comprises a display mounting recess 11, a rack 12 disposed inside the display mounting recess 11 and having two upright female screws (bosses with internal threads) 121, a circuit board 14 fastened to the upright female screws 121 to hold a display 13 inside the display mounting recess 11 for showing the operation speed of the computer, a through hole 111 within the display mounting recess 11 aligned with a through hole 101 on the mainframe of the computer, a cap 15 covered on the display mounting recess 11 over the display 13. By inserting a screwdriver or the like through the through holes 101 and 111 from the inside of the computer, the cap 15 can be pushed away from the display mounting recess 11. The cap 15 has a window 151, through which the data display on the display 13 is seen, a plurality of hooks 152 and a retaining block 153 raised from the back side around the border and respectively engaged into respective coupling portions (not shown) inside the display mounting recess 11.

Figure 4:
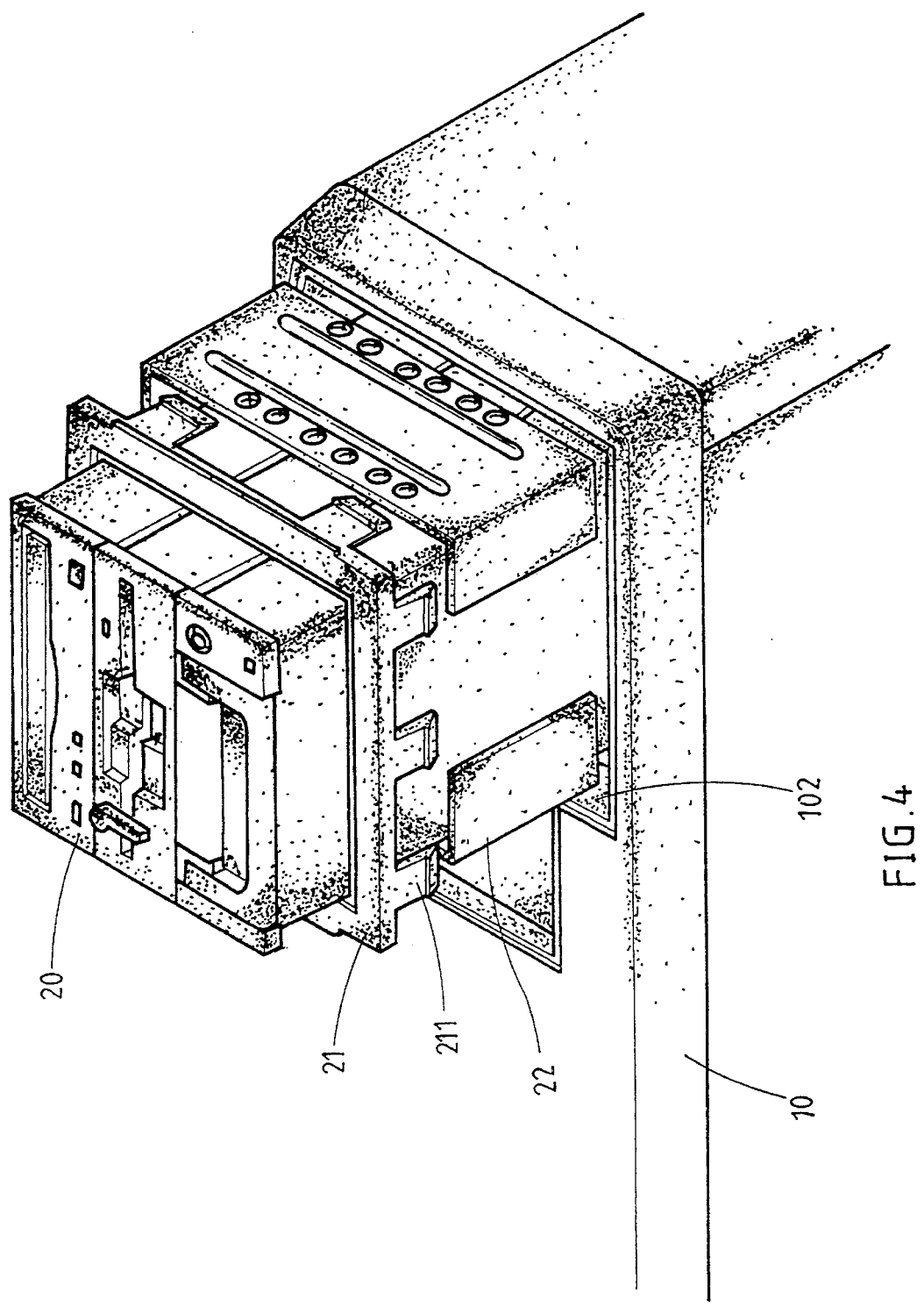
FIG. 4 shows the computer housing of the present invention arranged in the horizontal position to hold diskdrives by a holder frame and a loop-like locating frame.

Referring to FIG. 4, the front panel 10 further comprises a diskdrive slot 102 for mounting a plurality of diskdrives 20. The housing can be disposed in the horizontal position or vertical position as desired. When the housing is disposed in the horizontal position, the diskdrives 20 are arranged in a stack and inserted through a substantially loop-like locating frame 21 and then fastened together by a holder frame 22. The loop-like locating frame 21 has a plurality of backward hooks 211 spaced around the border at the back. When the holder frame 22 and the loop-like locating frame 21 are inserted into the diskdrive slot 102, the backward hooks 211 respectively hook on an inside edge (not shown) around the periphery of the diskdrive slot 102, and therefore the diskdrives 20 are firmly retained inside the diskdrive slot 102. Because the holder frame 22 and the diskdrives 20 will slip in the diskdrive slot 102 when the housing is disposed in the horizontal position, the installation of the loop-like locating frame 21 is necessary. When the loop-like locating frame 21 is installed, the holder frame 22 and the diskdrives 20 are firmly retained in place.

Figure 5:
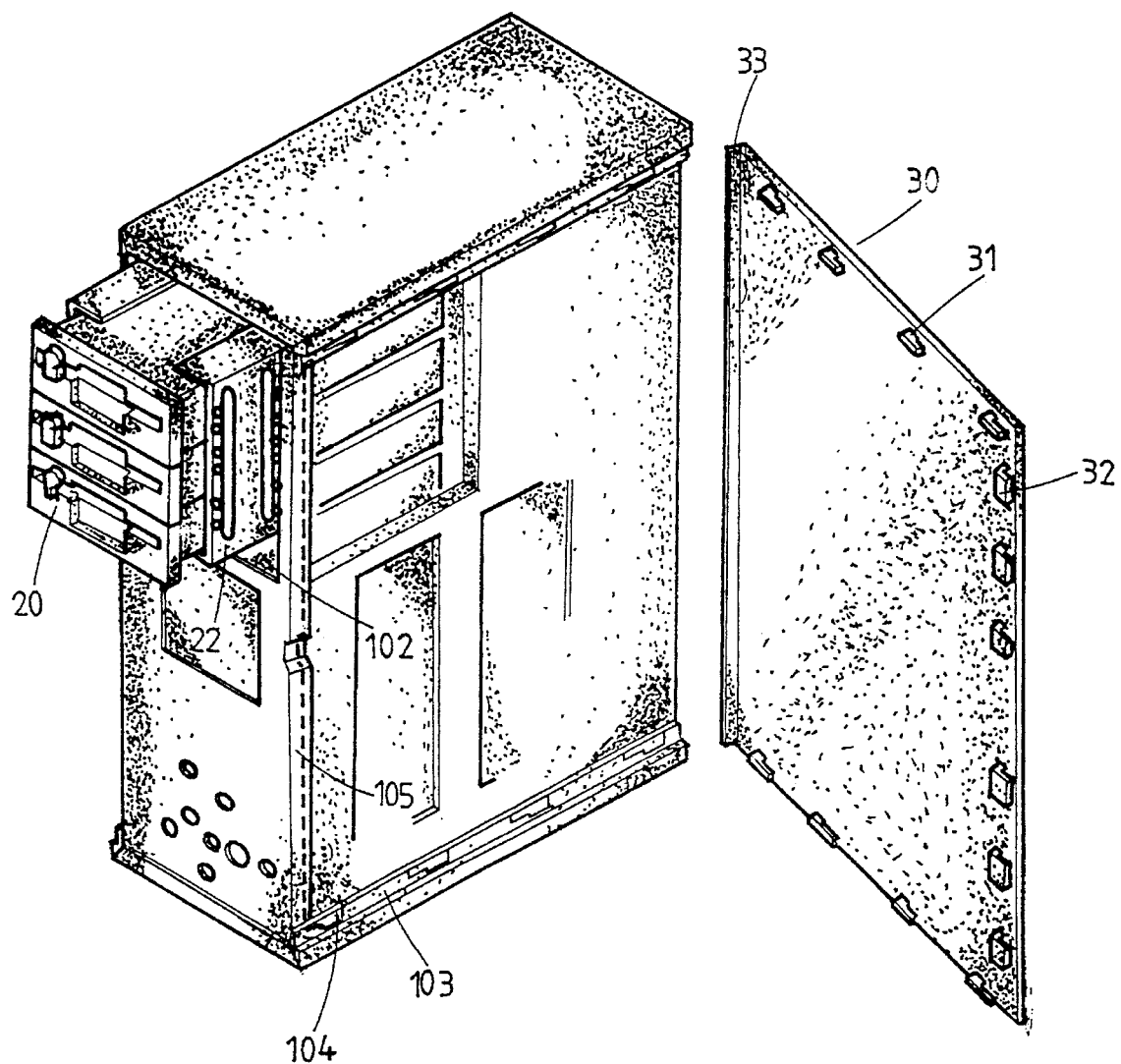
FIG. 5 is a dismantled view of the computer housing shown in FIG. 1.

Referring to FIG. 5, when the housing is disposed in the vertical position, the diskdrives 20 are arranged in a stack and fastened together by the holder frame 22 and then the holder frame 22 with the diskdrives 20 are put into the diskdrive slot 102. Because the holder frame 22 fits the diskdrive slot 102 horizontally when the housing is disposed in the vertical position, it is not necessary to use the aforesaid locating frame 21 to fasten the diskdrives 20 in place. The housing has two opposite sides respectively covered with a respective side panel 30. The side panel 30 has a plurality of first L-shaped retaining rods 31 horizontally spaced along the top and bottom edges, a plurality of second L-shaped retaining rods 32 vertically spaced along the left side edge, and a pull strip 33 vertically disposed along the right side edge at right angles. When the side panel 30 is inserted into top and bottom rails 103 at either side of the housing, the first L-shaped retaining rods 31 are respectively inserted into respective retaining holes 104 on the top and bottom rails 103, and the second L-shaped retaining rods 32 are engaged with a vertical side flange 105 at one side of the front panel 10. When the housing is disposed in the horizontal position, the side panels 30 act as the top and bottom panels of the computer. When the housing is disposed in the vertical position, the side panels 30 act as the left and right side panels of the computer. By pulling the pull strip 33 backwards, the side panel 30 is detached from the housing. When either side panel 30 is detached from the housing, the user can insert a screwdriver into the through holes 101 and 111 (see FIG. 3) to push the cap 15 away from the display mounting recess 11, and therefore the user can adjust the display 13 conveniently.

Figure 6:
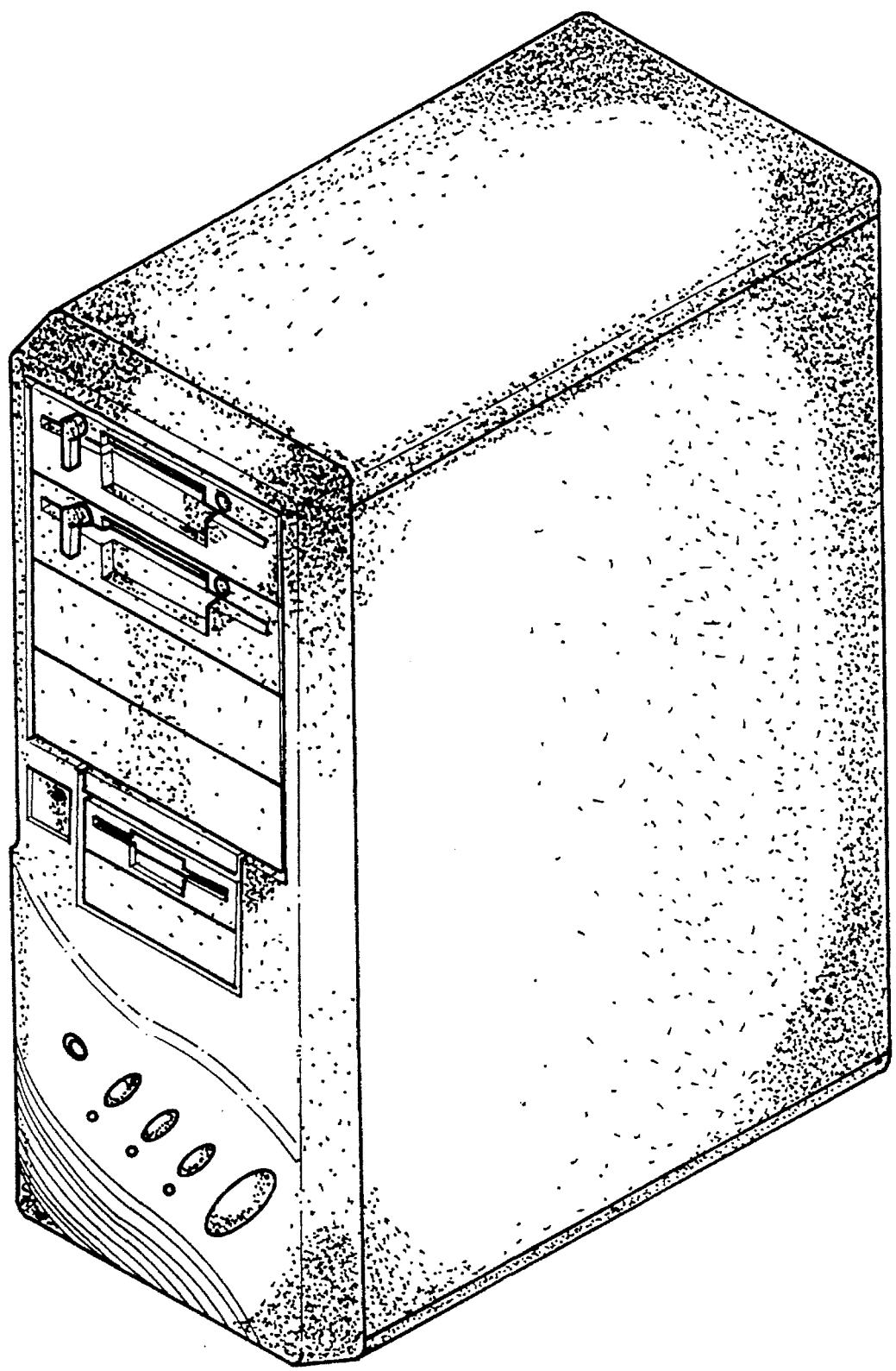
FIG. 6 shows the computer housing of the present invention installed in the vertical position.
Figure 7:
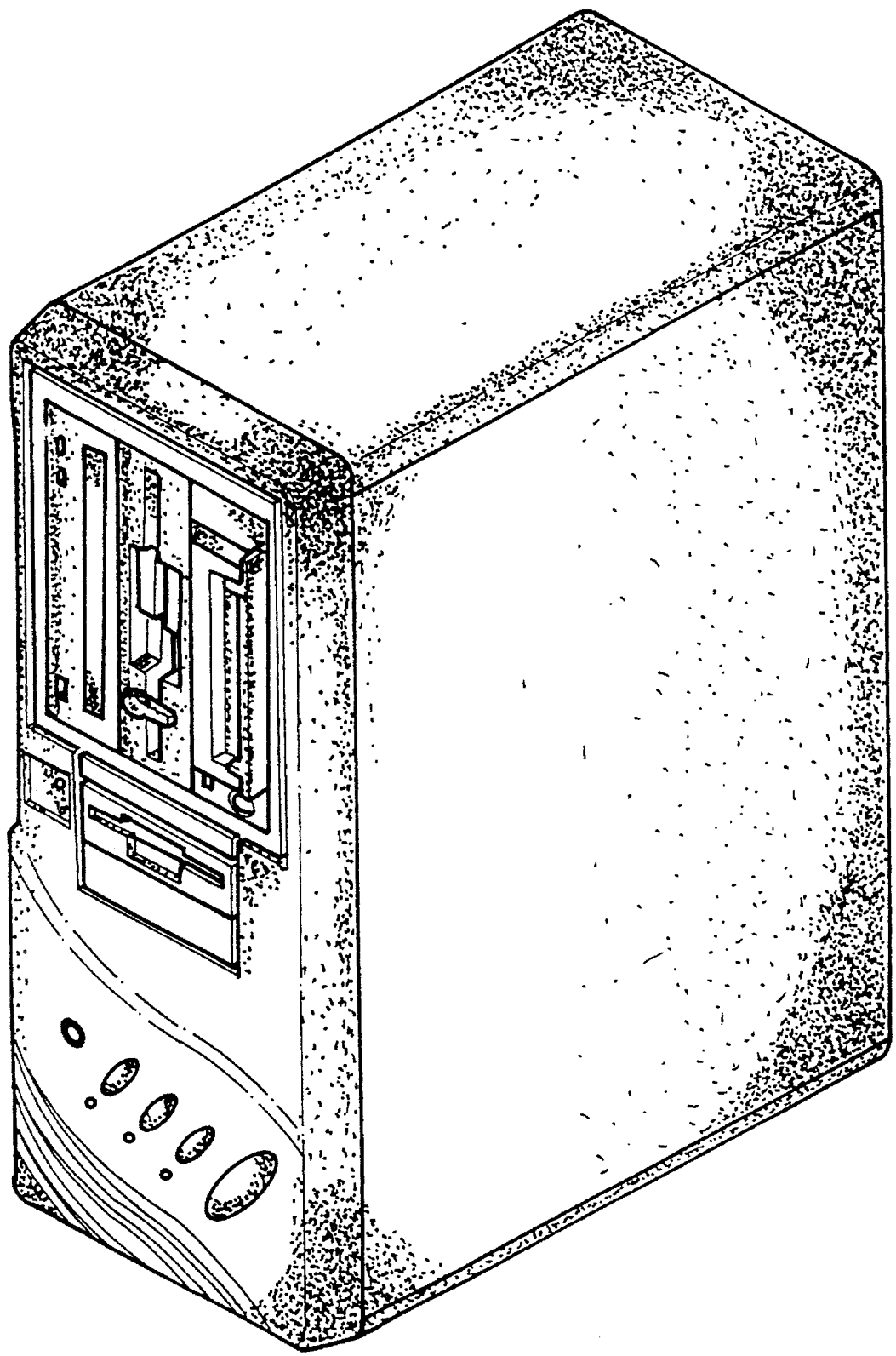
FIG. 7 shows the computer housing of the present invention installed in the horizontal position.

FIG. 6 shows the present invention installed in the vertical position. FIG. 7 shows the present invention installed in the horizontal position. Because a CD-ROM must be installed in the horizontal position for a normal operation, when the housing of the present invention is disposed in the horizontal position, CD-ROM and diskdrives can be fastened together by the locating frame 21 and then fastened to the diskdrive slot 102 of the housing.

While only one embodiment of the present invention has been shown and described, it will be understood that various modifications and changes could be made without departing from the spirit and scope of the invention.

What is claimed is:

1. A computer housing comprising a display mounting recess on a front panel thereof, a rack disposed inside said display mounting recess to hold a circuit board and a display for showing the operation speed of the computer, a cap fastened to said display mounting recess through hooked joints and covered over said display to seal out dust and having a window, through which the display is seen from the outside, a through hole through said display mounting recess for inserting a tool from the inside of the computer to push said cap away from said display mounting recess during a repair work.

2. The computer housing of claim 1 further comprising a holder frame inserted into a diskdrive slot on said front panel to hold a plurality of diskdrives in a stack.

3. The computer housing of claim 1 further comprising a holder frame inserted into a diskdrive slot on said front panel to hold a plurality of diskdrives in a stack, and a loop-like locating frame mounted around said diskdrives and fastened to the periphery of said diskdrive slot to hold said diskdrives in place, said loop-like locating frame having a plurality of backward hooks respectively hooked on an inside edge around the border of said diskdrive slot.

4. The computer housing of claim 1 further comprising two opposite side panels each having a plurality of L-shaped retaining rods angled in the same direction and engaged into respective retaining holes on two opposite side frames of the computer housing and a pull strip for moving the respective side panel backwards away from each side frame.

* * * * *